US008704843B2

(12) United States Patent
Saito

(10) Patent No.: US 8,704,843 B2
(45) Date of Patent: Apr. 22, 2014

(54) IMAGE PROCESSING APPARATUS AND IMAGE PROCESSING METHOD

(75) Inventor: Tetsuji Saito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 352 days.

(21) Appl. No.: 12/969,063

(22) Filed: Dec. 15, 2010

(65) Prior Publication Data

US 2011/0157209 A1 Jun. 30, 2011

(30) Foreign Application Priority Data

Dec. 28, 2009 (JP) ................................ 2009-297851
Sep. 9, 2010 (JP) ................................ 2010-201963

(51) Int. Cl.

| | |
|---|---|
| ***G09G 5/00*** | (2006.01) |
| ***G09G 5/02*** | (2006.01) |
| ***H04N 7/14*** | (2006.01) |
| ***H04N 5/228*** | (2006.01) |
| ***H04N 5/232*** | (2006.01) |
| ***H04N 11/04*** | (2006.01) |
| ***H04N 5/00*** | (2011.01) |
| ***H04N 1/407*** | (2006.01) |
| ***H04N 1/40*** | (2006.01) |
| ***H04N 1/38*** | (2006.01) |
| ***H04N 11/02*** | (2006.01) |
| ***G06K 9/40*** | (2006.01) |
| *H04B 1/10* | (2006.01) |
| *G06K 9/00* | (2006.01) |
| *G06K 9/36* | (2006.01) |

(52) U.S. Cl.

USPC ........... 345/589; 345/581; 345/643; 345/690; 345/698; 345/474; 348/14.15; 348/208.14; 348/352; 348/416.1; 348/607; 358/3.26; 358/448; 358/463; 375/240.16; 375/240.27; 375/254; 382/253; 382/274; 382/276; 382/260

(58) Field of Classification Search

USPC ......... 345/581, 589, 597, 600, 606, 617–618, 345/643, 474, 204, 690, 698–699, 214; 348/14.12, 14.14–14.15, 208.4, 348/208.14, 352–355, 365, 402.1, 407.1, 348/413.1, 416.1, 431, 451–452, 533, 538, 348/607, 671–672, 683, 665–667, 739; 375/240.16, 240.22, 240.27, 243, 254, 375/285; 382/251–253, 254, 274, 276, 382/298–300, 260; 358/3.26, 3.27, 504, 358/509, 516–520, 525, 533, 537, 448, 463

See application file for complete search history.

(56) References Cited

U.S. PATENT DOCUMENTS 4,860,104 A * 8/1989 Katsuyama .................. 348/620
5,150,207 A * 9/1992 Someya .................. 375/240.21

(Continued)

FOREIGN PATENT DOCUMENTS

JP 08069273 A * 3/1996
JP 2001-238209 8/2001

(Continued)

OTHER PUBLICATIONS

Xiong Yan et. al., A Effective Method for Trajectory Detection of Moving Pixel-sized Target, 1995.*

*Primary Examiner* — Wesner Sajous

(74) *Attorney, Agent, or Firm* — Cowan, Liebowitz & Latman, P.C.

(57) ABSTRACT

An image processing apparatus according to the present invention, comprises:

a motion detection unit that detects a motion vector from an input image;

a determination unit that determines whether an image is moving in each pixel in use of the detected motion vector, and determines whether a motion pixel, about which determination has been made that the image is moving therein, exists in a predetermined range from a still pixel about which determination has been made that the image is not moving therein; and a correction unit that performs correction processing to decrease at least one of high frequency components, contrast, and luminance for the still pixel about which determination has been made that a motion pixel exists in the predetermined range.

26 Claims, 15 Drawing Sheets

(56) References Cited

U.S. PATENT DOCUMENTS

| | | | | |
|---|---|---|---|---|
| 5,659,363 | A * | 8/1997 | Wilkinson | 375/240.11 |
| 5,761,343 | A * | 6/1998 | Haruma et al. | 382/236 |
| 5,777,681 | A * | 7/1998 | Kim et al. | 375/240.16 |
| 5,814,996 | A * | 9/1998 | Winter | 324/510 |
| 5,915,036 | A * | 6/1999 | Grunkin et al. | 382/132 |
| 6,061,100 | A * | 5/2000 | Ward et al. | 348/607 |
| 6,356,592 | B1 * | 3/2002 | Naito | 375/240.29 |
| 6,459,455 | B1 * | 10/2002 | Jiang et al. | 348/452 |
| 6,496,598 | B1 * | 12/2002 | Harman | 382/154 |
| 6,748,113 | B1 * | 6/2004 | Kondo et al. | 382/232 |
| 6,771,823 | B2 * | 8/2004 | Sakaida et al. | 382/232 |
| 6,784,942 | B2 * | 8/2004 | Selby et al. | 348/452 |
| 6,989,868 | B2 * | 1/2006 | Masukura et al. | 348/441 |
| 7,068,722 | B2 * | 6/2006 | Wells | 375/240.16 |
| 7,109,949 | B2 * | 9/2006 | Sekiya et al. | 345/58 |
| 7,162,101 | B2 * | 1/2007 | Itokawa et al. | 382/282 |
| 7,565,015 | B2 * | 7/2009 | Loce et al. | 382/199 |
| 7,693,343 | B2 * | 4/2010 | Klompenhouwer et al. | 382/260 |
| 7,724,289 | B2 * | 5/2010 | Kudo | 348/231.2 |
| 8,026,931 | B2 * | 9/2011 | Sun et al. | 345/632 |
| 8,040,379 | B2 * | 10/2011 | Makino et al. | 348/208.16 |
| 8,041,075 | B2 * | 10/2011 | Lei et al. | 382/103 |
| 8,130,840 | B2 * | 3/2012 | Mishima et al. | 375/240.16 |
| 8,144,247 | B2 * | 3/2012 | Kim et al. | 348/452 |
| 8,385,430 | B2 * | 2/2013 | Higuchi | 375/240.26 |
| 8,405,768 | B2 * | 3/2013 | Kawai | 348/441 |
| 2001/0036319 | A1 * | 11/2001 | Sakaida et al. | 382/232 |
| 2002/0191841 | A1 * | 12/2002 | Harman | 382/154 |
| 2003/0001964 | A1 * | 1/2003 | Masukura et al. | 348/441 |
| 2003/0071917 | A1 * | 4/2003 | Selby et al. | 348/452 |
| 2003/0090751 | A1 * | 5/2003 | Itokawa et al. | 358/538 |
| 2004/0057517 | A1 * | 3/2004 | Wells | 375/240.16 |
| 2004/0233157 | A1 * | 11/2004 | Sekiya et al. | 345/156 |
| 2005/0163402 | A1 * | 7/2005 | Aiso | 382/300 |
| 2005/0190288 | A1 * | 9/2005 | Yamada | 348/371 |
| 2005/0259164 | A1 * | 11/2005 | Kudo | 348/231.2 |
| 2006/0170822 | A1 * | 8/2006 | Baba et al. | 348/500 |
| 2006/0245665 | A1 * | 11/2006 | Lee et al. | 382/266 |
| 2007/0147684 | A1 * | 6/2007 | Loce et al. | 382/199 |
| 2007/0216675 | A1 * | 9/2007 | Sun et al. | 345/419 |
| 2008/0170751 | A1 * | 7/2008 | Lei et al. | 382/103 |
| 2008/0316359 | A1 * | 12/2008 | Kim et al. | 348/571 |
| 2009/0135270 | A1 * | 5/2009 | Makino et al. | 348/222.1 |
| 2009/0153743 | A1 * | 6/2009 | Arashima | 348/699 |
| 2009/0244389 | A1 * | 10/2009 | Mishima et al. | 348/699 |
| 2010/0026904 | A1 * | 2/2010 | Higuchi | 348/700 |
| 2010/0061648 | A1 * | 3/2010 | Wong et al. | 382/260 |
| 2010/0123829 | A1 * | 5/2010 | Kawai | 348/571 |
| 2010/0150474 | A1 * | 6/2010 | Aiso | 382/284 |
| 2011/0177841 | A1 * | 7/2011 | Attwood | 455/556.1 |
| 2011/0286673 | A1 * | 11/2011 | Givon et al. | 382/199 |
| 2012/0019614 | A1 * | 1/2012 | Murray et al. | 348/36 |

FOREIGN PATENT DOCUMENTS

| | | | |
|---|---|---|---|
| JP | 2004355011 | A * | 12/2004 |
| JP | 2005184442 | A * | 7/2005 |

* cited by examiner

*FIG. 9*

COLLECTION LEVEL : 2

VERTICAL FILTER EN : 1
VERTICAL 5 TAP EN : 1
VERTICAL 9 TAP EN : 0
VERTICAL MOTION VECTOR : Vy

HORIZONTAL FILTER EN : 1
HORIZONTAL 5 TAP EN : 1
HORIZONTAL 9 TAP EN : 0
HORIZONTAL MOTION VECTOR : Vx

IMAGE PROCESSING APPARATUS AND IMAGE PROCESSING METHOD

BACKGROUND OF THE INVENTION

1. Field of the Invention

The present invention relates to an image processing apparatus and an image processing method.

2. Description of the Related Art

When visually tracking a moving object (e.g. telop) on an impulse type display having quick response speed, the background of the previous frame image (background which is no longer displayed (especially the edge portion)) may be seen as an after image, which is characteristic of the human visual sense. Sometimes multiple images of a background are seen, which exhibits an artificial sensation. This phenomena tends to occur on an SED (Surface-condition Electron-emitter Display), FED (Field Emission Display) and on an organic EL display, for example.

FIG. 15 shows two frame images which are continuous in time. The area enclosed by the dotted line indicates a field of view of a viewer. As FIG. 15 shows, the background around a telop ("ABC" in FIG. 15) in frame image 1 is seen by the viewer as an after image also in frame image 2. This is because human eyes have the characteristic of "tracking a moving object", where "instantaneous light emission persists in human vision (that is, if the display apparatus is an impulse type, the previous frame image continues to be seen)". Particularly in the case of viewing an image displayed on a large screen display apparatus at a distance close to the screen, interference by an after image increases, since the moving distance of the field of view, when the viewer is tracking a moving object, increases.

An available prior art determines whether a pixel in an edge portion (edge pixel) is a pixel in a target area (area the viewer is focusing on) or not, based on the density of peripheral edge pixels (edge density), and decreases high frequency components in an area of which edge density is high (Japanese Patent Application Laid-Open No. 2001-238209).

However an area of such a pattern as "leaves" around which a moving object does not exist could be a target area, but the edge density in such an area is high. A motion area, where an image is moving, could become a target area, but if this area is an area for a telop, the edge density in this area also is high. If the technology disclosed in Japanese Patent Application Laid-Open No. 2001-238209 is used in these cases, such a target area blurs.

SUMMARY OF THE INVENTION

The present invention provides a technology for decreasing interference due to multiple images seen in the peripheral area of a motion area, without dropping the image quality of the area which the viewer is focusing on.

An image processing apparatus according to the present invention, comprises:

a motion detection unit that detects a motion vector from an input image;

a determination unit that determines whether an image is moving in each pixel in use of the detected motion vector, and determines whether a motion pixel, about which determination has been made that the image is moving therein, exists in a predetermined range from a still pixel about which determination has been made that the image is not moving therein; and a correction unit that performs correction processing to decrease at least one of high frequency components, contrast, and luminance for the still pixel about which determination has been made that a motion pixel exists in the predetermined range.

An image processing method according to the present invention comprising steps of:

detecting a motion vector from an input image;

determining whether an image is moving in each pixel in use of the detected motion vector; and determining whether a motion pixel, about which determination has been made that the image is moving therein, exists in a predetermined range from a still pixel, about which determination has been made that the image is not moving therein; and performing correction processing to decrease at least one of high frequency components, contrast, and luminance for the still pixel about which determination has been made that a motion pixel exist in the predetermined range.

According to the present invention, interference due to multiple images seen in the peripheral area of a motion area can be decreased without dropping the image quality of the area which the viewer is focusing on.

Further features of the present invention will become apparent from the following description of exemplary embodiments with reference to the attached drawings.

BRIEF DESCRIPTION OF THE DRAWINGS

FIG. 9 shows an example of each variable determined for a certain pixel;

DESCRIPTION OF THE EMBODIMENTS

EXAMPLE 1

(General Configuration)

An image processing apparatus and an image processing method according to Example 1 of the present invention will now be described.

In this example, a correction processing (filter processing) to decrease high frequency components is performed for a specific pixel in an input image. Thereby the interference due to multiple images seen in a peripheral area of a motion area, where an image is moving, can be decreased without dropping the image quality of the area the viewer is focusing on (target area). The "specific pixel" will be described in detail later.

Figure 1:
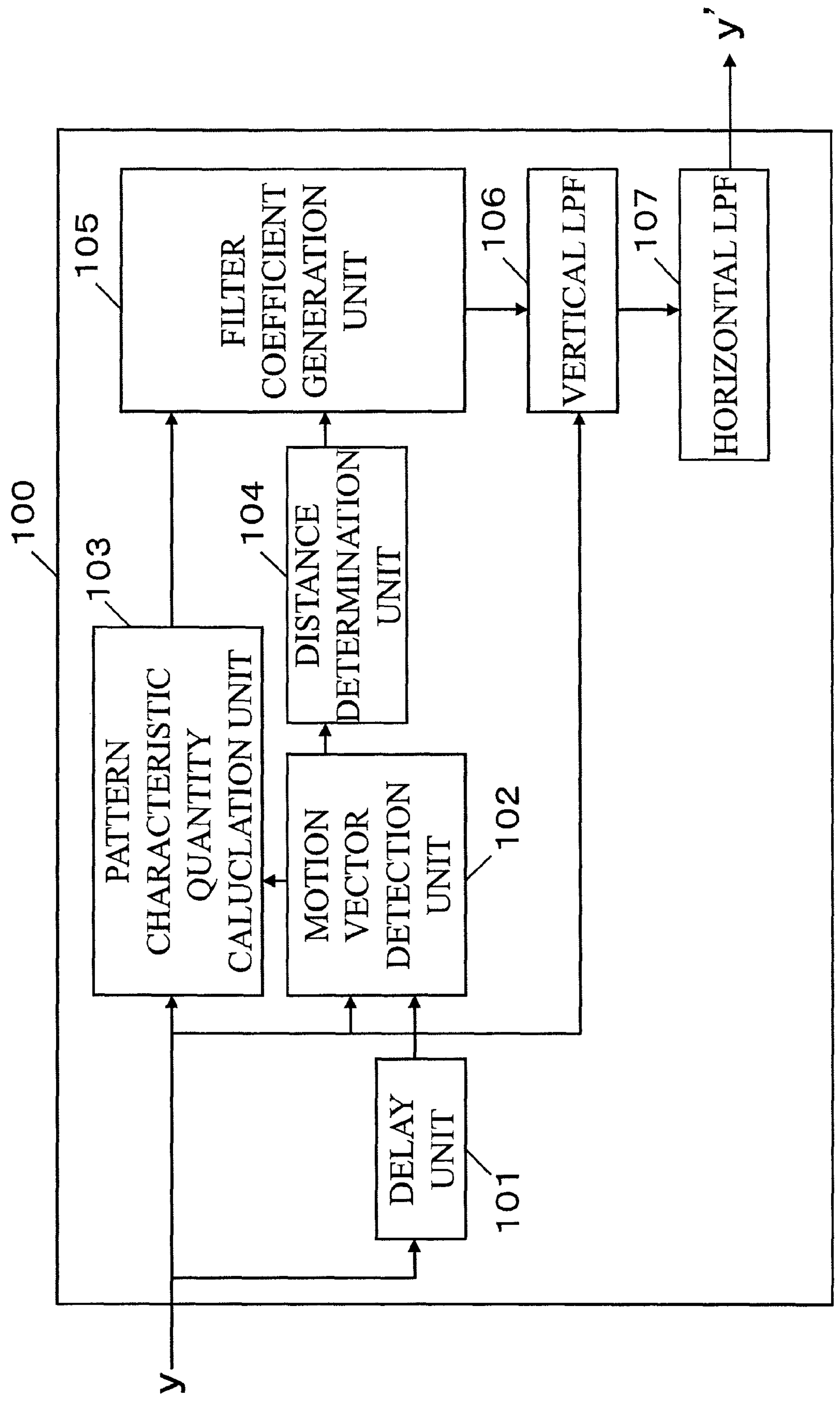
FIG. 1 is a diagram depicting an example of a functional configuration of an image processing apparatus according to Example 1.

FIG. 1 is a block diagram depicting a functional configuration of an image processing apparatus according to this example. As FIG. 1 shows, the image processing apparatus 100 has a delay unit 101, a motion vector detection unit 102, a pattern characteristic quantity calculation unit 103, a distance determination unit 104, a filter coefficient generation unit 105, a vertical LPF (Low Pass Filter) 106 and a horizontal LPF 107. The image processing apparatus 100 performs image processing on the video signal y (input image) which is input, and outputs a video signal y' (output image). The video signal is a luminance signal for each pixel, for example, and is input/output in frame units.

The delay unit 101 delays the input frame image by one frame unit, and outputs it.

The motion vector detection unit 102 detects a motion vector from the input image (the motion detection unit). In concrete terms, the motion vector detection unit 102 determines a motion vector using the present frame image (current frame image) and the previous frame image delayed by the delay unit 101 (previous frame image), and holds the motion vector in an SRAM or frame memory, which is not illustrated. The motion vector may be detected for each pixel, or may be detected for each block having a predetermined size (detected for each pixel in this example). For detecting a motion vector, a general method, such as a block matching method, can be used.

Figure 2:
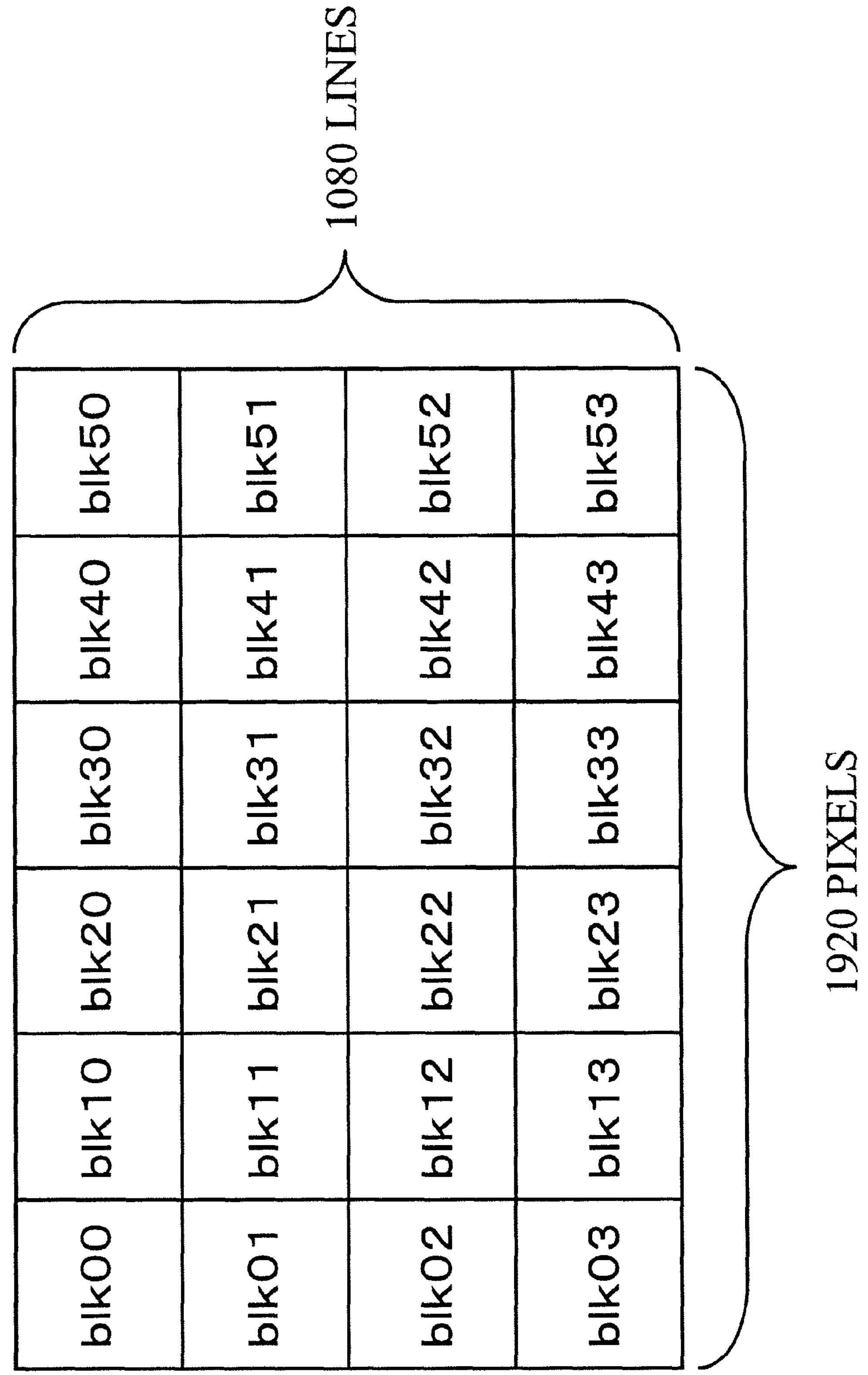
FIG. 2 is a diagram depicting an example of sub-areas.
Figure 7:
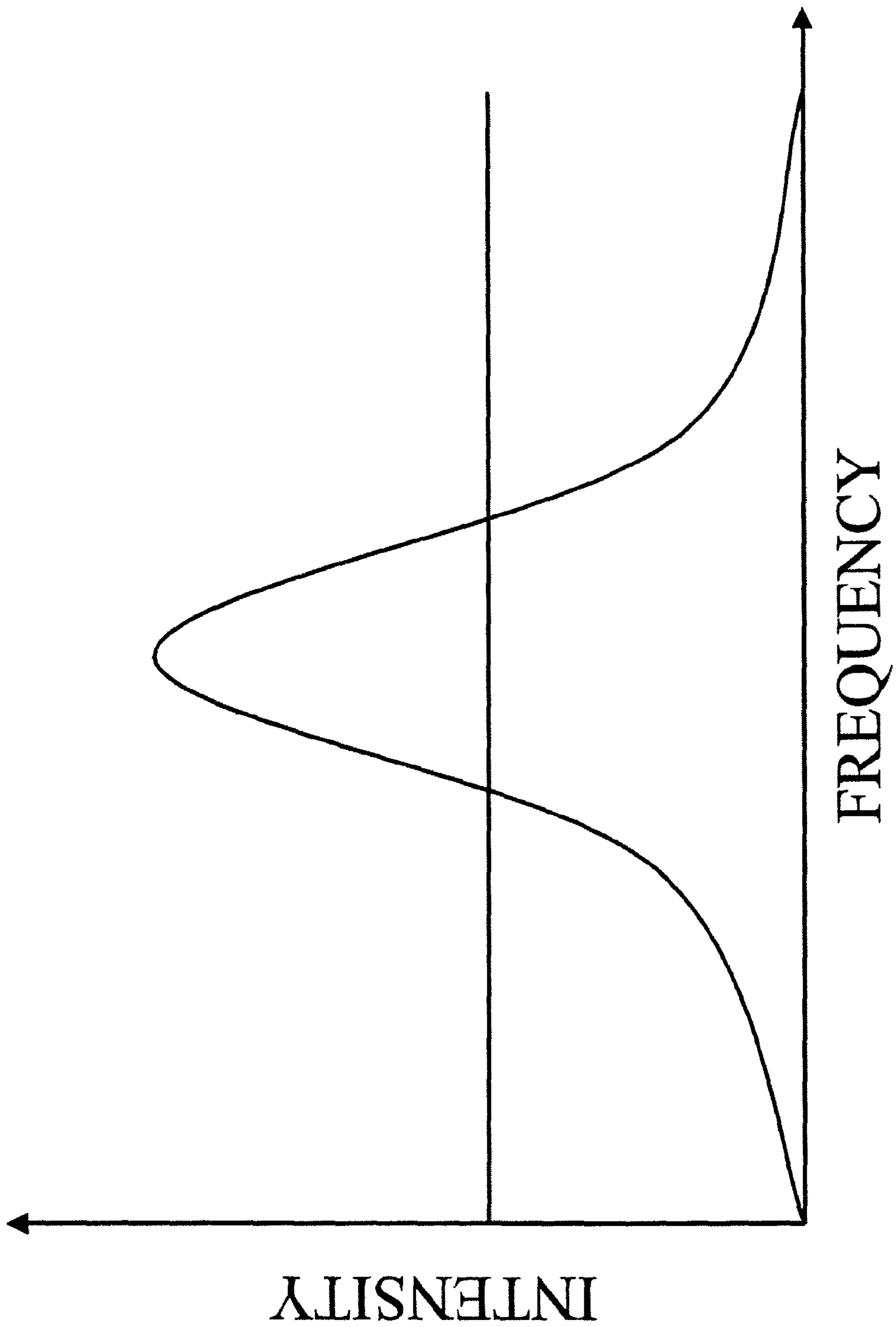
FIG. 7 is a graph depicting an example of a frequency distribution.

The pattern characteristic quantity calculation unit 103 determines whether an image is moving for each pixel, using the motion vector detected by the motion vector detection unit 102. Then the pattern characteristic quantity calculation unit 103 divides a frame image (current frame image) which includes a correction target pixel into a plurality of sub-areas, and calculates the frequency distribution and luminance value for each of the sub-areas using still pixels (pixels determining that the image is not moving) located in the sub-area. In other words, the pattern characteristic quantity calculation unit 103 corresponds to the frequency distribution calculation unit and the luminance value calculation unit. The frequency distribution is a distribution of which ordinate is intensity and abscissa is frequency, as shown in FIG. 7, and the luminance value is the APL (Average Picture Level) of the sub-area. In this example, it is assumed that the current image is an image having 1920×1080 pixels, which is divided into 6×4 sub-areas, as shown in FIG. 2. An identifier blkxy (x=0 to 5, y=0 to 3) is assigned to each sub-area, as shown in FIG. 2. The frequency distribution and luminance values are linked to an identifier of a corresponding sub-area held in an SRAM or frame memory.

The distance determination unit 104 determines whether the image is moving for each pixel using the motion vector detected by the motion vector detection unit 102. For a still pixel (pixel determining that the image is not moving), the distance determination unit 104 determines whether a motion pixel (pixel determining that the image is moving) exists in a predetermined range from this still pixel. In other words, the distance determination unit 104 corresponds to the determination unit.

In this example, a distance coefficient, which indicates whether a motion pixel exists within a predetermined range from the still pixel, and how far the motion pixel, if it exists, is apart from the still pixel, is determined for each still pixel of the current frame image. In concrete terms, this is determined by scanning each pixel (motion vector of each pixel) by a later mentioned scan filter. The distance coefficient is used for determining a degree of correction processing (filter coefficient of the filter). Also in this example, the distance determination unit 109 determines a number of taps of the filter and the tap direction based on the motion vector of each pixel scanned by the scan filter. The tap direction here means a direction of the taps arrayed in the filter.

Figure 3:
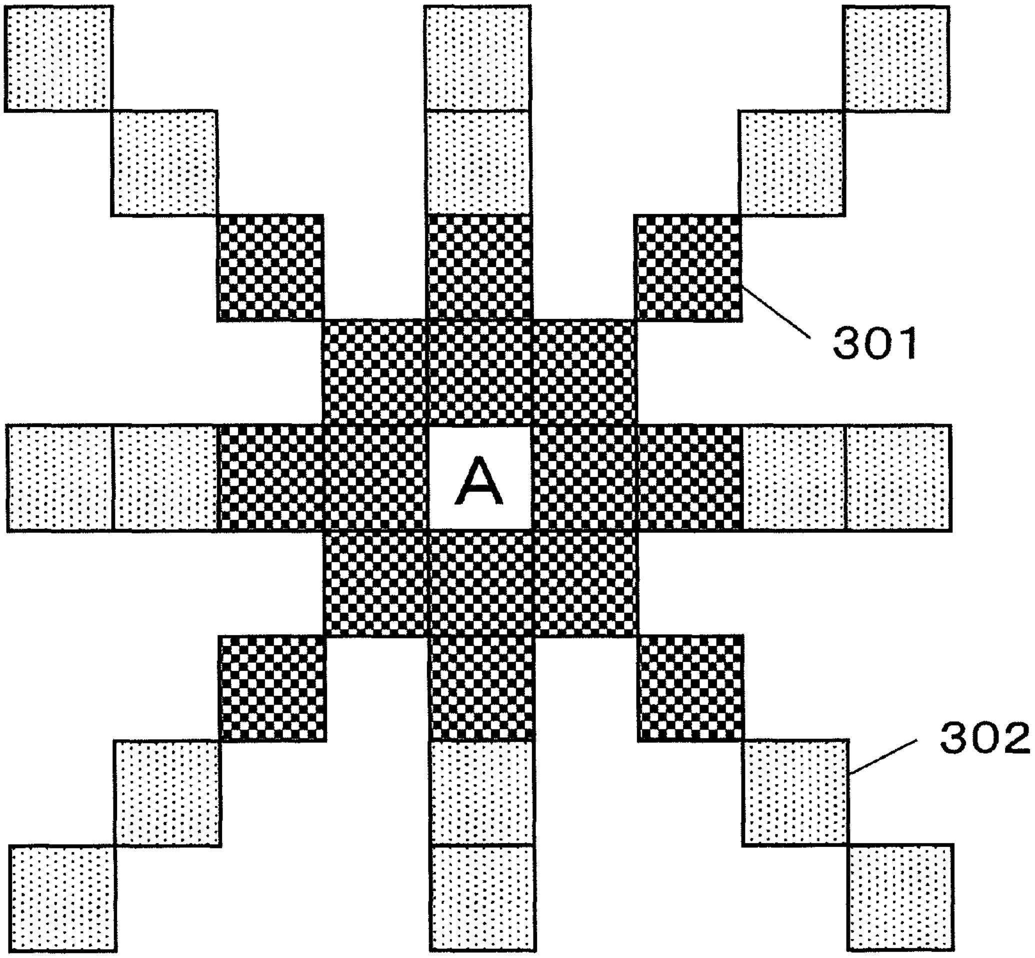
FIG. 3 is a diagram depicting an example of a scan filter.

FIG. 3 shows an example of the scan filter used for the distance determination unit 104. This scan filter corresponds to a field of view of human, and is constituted by a two-dimensional filter for scanning 9 pixels in the vertical direction, horizontal direction, and (two types of) diagonal directions respectively with the target pixel A at the center, totalling 33 pixels. The scan filter is sectioned into two areas, 301 and 302, depending on the distance from the target pixel A. The mosaic area 301 is an area where the distance from the target pixel A is short, and the dotted area 302 is an area which is more distant from the target pixel A (area where the distance from the target pixel A is longer than the area 301). The shape and size of the scan filter are not limited to this example. The shape of the scan filter may be a square or circle, and the size in one direction (e.g. one side of a square, diameter of a circle) may be 7 pixels, 15 pixels or 21 pixels, for example. In this example, the scan filter is sectioned into two areas, 301 and 302, but the number of sections is not limited to this. The scan filter may be sectioned into 5 areas or 10 areas, for example, or may be sectioned in pixel units. Also the scan filter need not be sectioned at all.

The filter coefficient generation unit 105 determines whether correction processing is performed and decides the degree of correction processing, using the motion vector of each pixel, the frequency distribution and luminance value of each block, and the distance coefficient of each pixel. For example, it is determined that the correction processing is performed for a still pixel from which a motion pixel exists in a predetermined range (areas 301 and 302 in FIG. 3). The correction processing is performed with the vertical LPF 106 and the horizontal LPF 107. In other words, according to this example, a still pixel from which a motion pixel exists within a predetermined range (above mentioned "specific pixel") becomes a correction target. This combination of the filter coefficient generation unit 105, vertical LPF 106 and horizontal LPF 107 corresponds to the correction unit. The vertical LPF 106 is an LPF of which tap direction is vertical (LPF of which taps are arrayed in the vertical direction), and the horizontal LPF 107 is an LPF of which tap direction is horizontal (LPF of which taps are arrayed in the horizontal direction).

(Processing in the Distance Determination Unit 104)

Figure 4:
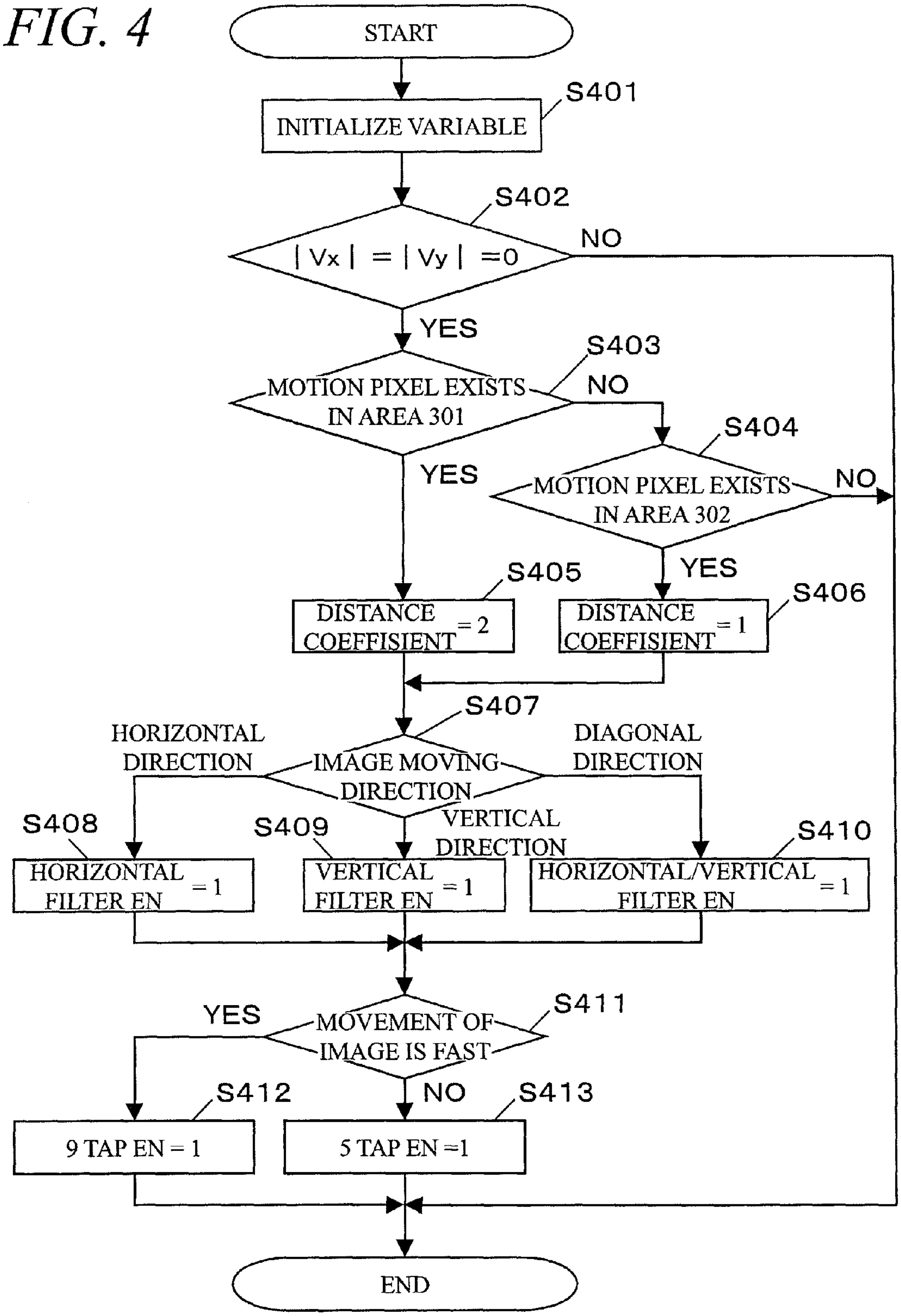
FIG. 4 is a flow chart depicting an example of a processing flow of a distance determination unit.

Now processing in the distance determination unit 104 will be described in concrete terms with reference to FIG. 4.

First in step S401, all the variables are initialized. Variables are the distance coefficient, vertical filter EN, horizontal filter EN, a 5 tap EN and 9 tap EN. The vertical filter EN is an enable signal for the vertical LPF 106. The horizontal filter EN is an enable signal for the horizontal LFP 107. The 5 tap EN is an enable signal to determine a number of taps of an LPF to 5. And the 9 tap EN is an enable signal to determine a number of taps of an LPF to 9. It is assumed that an initial value of each variable is a value for not executing a corresponding processing ("0" in this example).

In step S402, it is determined whether the motion of the image at the position of the target pixel A of the scan filter is moving (whether target pixel A is a motion pixel). In concrete terms, it is determined whether both the absolute value |Vx | of the horizontal (X direction) component of the motion vector (horizontal motion vector) and the absolute value |Vy | of the vertical direction (Y direction) component of the motion vector (vertical motion vector) of the target pixel A are greater than 0. If the motion pixel is filtered by an LPF, the moving object is blurred (area where image is moving could be a target area, so it is not desirable that this area is blurred). Therefore if the target pixel A is a motion pixel (step S402: NO), processing ends with maintaining each variable at an initial value so that the horizontal and vertical LPFs are not used. If the target pixel A is a still pixel (step S402: YES), then processing advances to step S403. If the size of the motion vector of the target pixel A is less than a predetermined value, the distance determination unit 104 may determine this pixel as a still pixel.

In step S403, it is determined whether two or more motion pixels exist in the area 301. If 2 or more motion pixels exist (step S403: YES), processing advances to step S405, and if 2 or more motion pixels do not exist (step S403: NO), processing advances to step S404. Here the number of pixels for a criteria is 2 pixels, because determination errors due to noise are decreased. The number of pixels for criteria is not limited to 2 (it can be 1 pixel, or 3 or 5 pixels).

In step S404, it is determined whether 2 or more motion pixels exist in the area 302. If 2 or more motion pixels exist (step S404: YES), processing advances to step S406. If 2 or more motion pixels do not exist (step S404: NO), this means that motion pixels do not exist around the target pixel A (image is not moving). Since an area around which an image is not moving could be a target area, each variable remains as the initial value, and processing ends.

In steps S405 and S406, a distance coefficient by which correction degree of the correction processing increases as the distance between the target pixel A (still pixel to be a correction target) and the motion pixel detected in steps S403 and S404 decreases, are determined. As a still area (an area where the image is not moving) becomes closer to a position where the image is moving, it is more likely that the image appears to be multiple, so by determining such a distance coefficient, interference due to a still area appearing to be multiple can be suppressed with more certainty.

In concrete terms, in step S405, a motion pixel exists in a position close to the target pixel A (area 301), so the distance coefficient is determined to be "2" (distance coefficient for performing correction processing of which correction degree is high).

In step S406, a motion pixel exists in a position distant from the target pixel A (area 302), so the distance coefficient is determined to be "1" (distance coefficient for performing correction processing of which correction degree is lower than the distance coefficient "2").

These distance coefficients are linked with the coordinate values of the target pixel A. And this information is stored in an SRAM or frame memory, for example, of which output timing is adjusted in a circuit, and is output to the filter coefficient generation unit 105 in a subsequent stage.

Figure 5B:
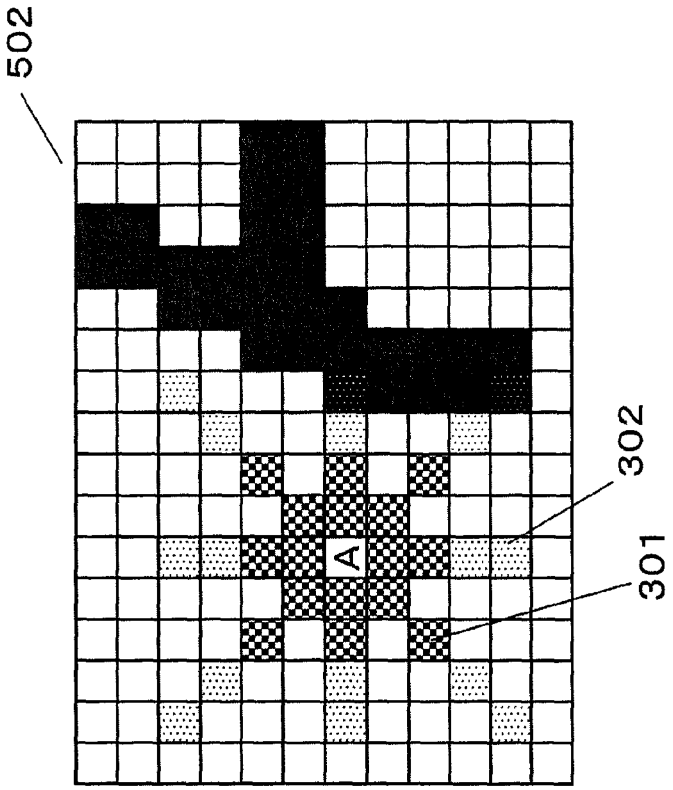
FIG. 5A and FIG. 5B are diagrams depicting a processing of the distance determination unit.
Figure 5A:
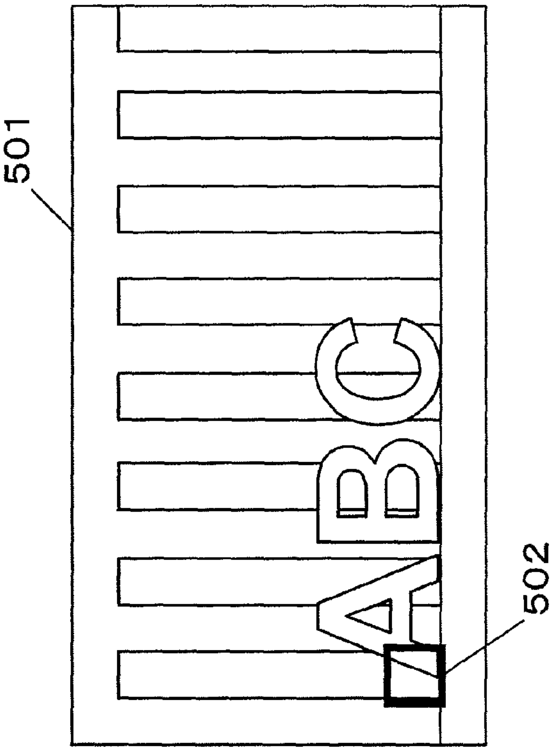

Processing thus far will now be described using a case of inputting the image shown in FIG. 5A as an example. In FIG. 5A, the reference number 501 indicates a displayed image, where the telop "ABC" is being scrolled from left to right on screen. Now the area 502 is focused on. FIG. 5B is an enlarged view of the area 502 in FIG. 5A. In FIG. 5B, one square indicates a pixel, and a square filled in black is a motion pixel. The distance determination unit 104 determines a distance coefficient for each pixel using the scan filter in FIG. 3. In the example of FIG. 5B, 2 or more motion pixels exist in the area 302, so the distance coefficient with respect to the target pixel A (specifically, the coordinate values thereof) is "1".

After steps S405 and S406, processing advances to step S407.

In steps S407 to S410, a tap direction of a filter, to be used for correction processing (filter to be used), is determined according to the direction of a motion vector which exists in the predetermined range. If the image is moving, the still area around the image is seen as multiple in a same direction as the motion of the image. Therefore according to the present example, the tap direction of the filter is matched with the direction of the motion of the image. Thereby interference due to images appearing to be multiple can be decreased more efficiently.

In step S407, the motion vector of each motion pixel detected in steps S403 and S404 is analyzed, so as to determine the motion of the image around the target pixel A (still pixel to be the correction target). In concrete terms, it is determined which direction of the motion vector most frequently appears in the detected pixels, out of the horizontal direction, vertical direction and diagonal directions. If the motion vector in the horizontal direction appears most frequently, processing advances to step S408, if the motion vector in the vertical direction appears most frequently, processing advances to step S409, and if the motion vector in a diagonal direction appears most frequently, processing advances to step S410.

In step S408, only the horizontal filter EN is set to "1" ("1" here means using the corresponding filter).

In step S409, only the vertical filter EN is set to "1".

In step S410, both the horizontal filter EN and the vertical filter EN are set to "1".

After steps S408 to S410, processing advances to step S411.

In steps S411 to S413, a number of taps of a filter, to be used for correction processing, is determined according to the magnitude of the motion vector of the motion pixel of which presence in a predetermined range is determined. In the still area, interference due to an image appearing to be multiple increases as the motion of the peripheral image is faster. Therefore according to this example, a number of taps is increased as the magnitude of the motion vector of the motion pixel, of which presence in a predetermined range is determined, is larger. As a result, interference due to the image appearing to be multiple can be decreased more effectively.

In step S411, the average values of |Vx| and |Vy| of the motion pixels detected in steps S403 and S404 are calculated respectively. Then these average values are compared with a threshold MTH ((Expression (1-1) and Expression (1-2)). If at least one of Expression (1-1) and Expression (1-2) is satisfied, it is determined that the motion of the image around the target pixel is fast, and processing advances to step S412. If neither are satisfied, it is determined that the motion of the image around the target pixel is slow, and processing advances to step S413.

$$\frac{\text{Total value of } |Vx|}{\text{Number of motion pixels}} > MTH \quad \text{Expression (1-1)}$$

$$\frac{\text{Total value of } |Vy|}{\text{Number of motion pixels}} > MTH \quad \text{Expression (1-2)}$$

In step S412, a number of taps is determined to be 9 (9 tap EN is set to "1").

In step S413, a number of taps is determined to be 5 (5 tap EN is set to "1").

By the above processing, the distance coefficient, horizontal filter EN, vertical filter EN, 5 tap EN and 9 tap EN are determined for each pixel.

The number of taps may be common for the horizontal direction and vertical direction, or may be set independently for each direction. For example, a vertical 5 tap EN or vertical 9 tap EN for determining a number of taps in the vertical direction, and a horizontal 5 tap EN or horizontal 9 tap EN for determining a number of taps in the horizontal direction may be set. And if Expression (1-1) is satisfied, the horizontal 9 tap EN is set to "1", and if Expression (1-2) is satisfied, the vertical 9 tap EN is set to "1".

(Processing in the Filter Coefficient Generation Unit 105)

Figure 6:
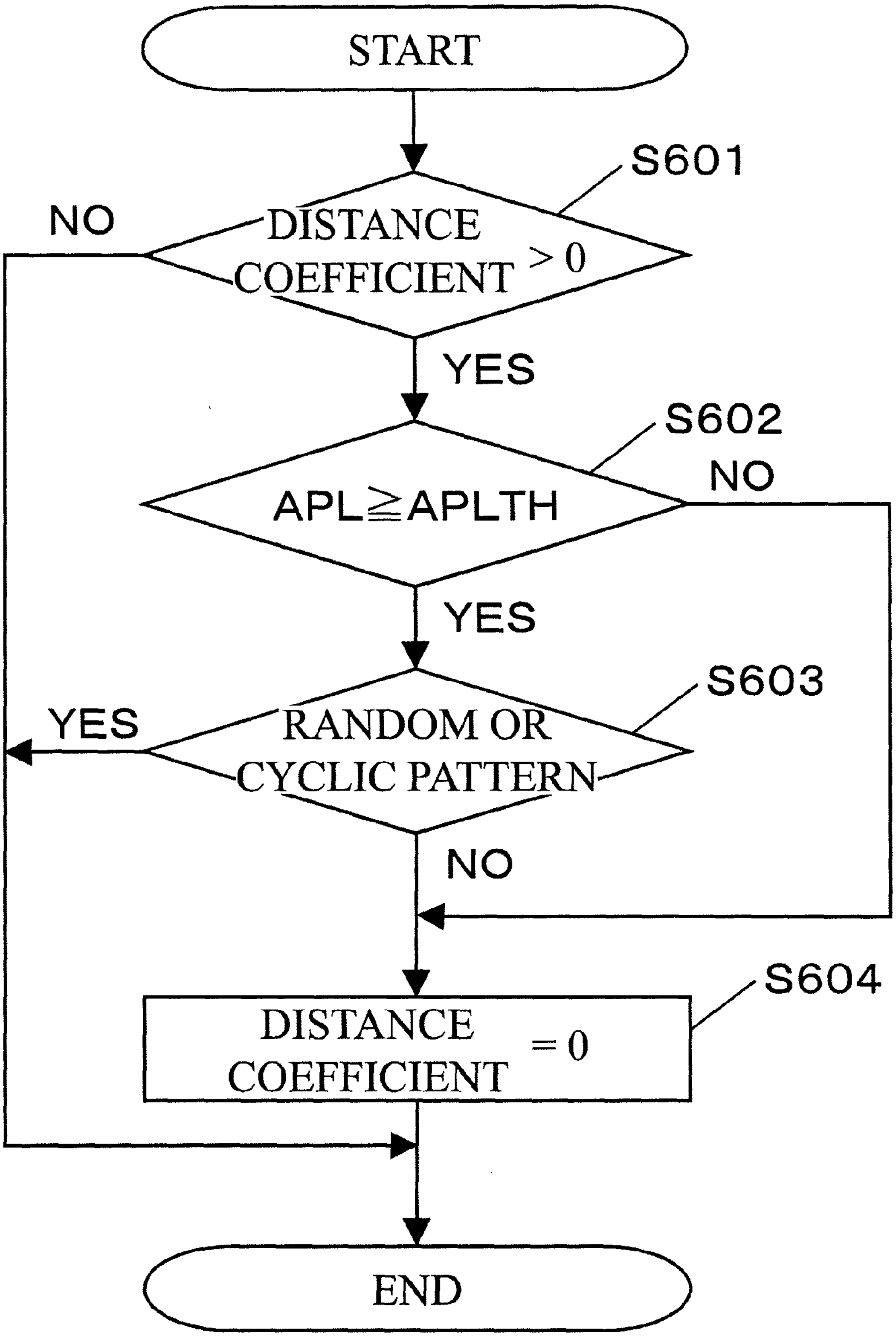
FIG. 6 is a flow chart depicting an example of a processing flow of a filter coefficient generation unit.

Now the processing in the filter coefficient generation unit 105 will be described in concrete terms with reference to FIG. 6. The processing shown in the flow chart in FIG. 6 is performed for all the pixels (in pixel units).

In step S601, it is determined whether the distance coefficient of the processing target pixel is greater than 0, and if greater, processing advances to step S602, and if smaller, processing ends.

In step S602, it is determined which sub-area to which the processing target pixel belongs. Then the APL of the sub-area to which the processing target pixel belongs is compared with the threshold APLTH (predetermined luminance value), to determine whether this sub-area is bright or not.

If the APL is higher than the APLTH (if the sub-area is bright), processing advances to step S603, and if the APL is lower than the APLTH (if the sub-area is dark), processing advances to step S604.

In step S603, it is determined whether the patterns (designs) of the sub-area (specifically the still area therein) are random designs or cyclic pattern designs on the frequency distribution of the sub-area to which the processing target pixel belongs. In concrete terms, if the frequency distribution has roughly uniform distribution (distribution 701 in FIG. 7), it is determined that the patterns in the sub-area are random. And if the frequency distribution is a distribution concentrated to a predetermined frequency (distribution 702 in FIG. 7), then it is determined that the patterns in the sub-area are cyclic.

If it is determined that the patterns in the sub-area are random patterns or cyclic patterns (step S603: YES), processing ends, and if not, processing advances to step S604.

In step S604, the distance coefficient is set to "0" again, so that an LPF is not used, and processing ends.

If the luminance of the still area is low, or if the patterns in the still area are not random or cyclic, interference due to the still image appearing to be multiple is small (an after image is not perceived very much). Therefore, as mentioned above, according to this example, the target of correction processing is limited to the pixels in a sub-area where luminance of the still area is high, and in a sub-area where patterns in the still image are random or cyclic. Thereby the processing load can be decreased.

Now a method for determining a filter coefficient will be described.

First an LPF is briefly described. If a number of taps is 5, the LPF determines the pixel value after correction using 5 pixels (pixel values 1 to 5) corresponding to the position of each tap, with the position of the correction target pixel as the center of the filter (Expression (1-3)).

$$\text{Pixel value } 3' = \frac{\text{Pixel value } 1 \times C1 + \text{Pixel value } 2 \times C2 + \text{Pixel value } 3 \times C3 + \text{Pixel value } 4 \times C4 + \text{Pixel value } 5 \times C5}{C1 + C2 + C3 + C4 + C5} \quad \text{Expression (1-3)}$$

Here pixel value 3 is a pixel value of a correction target pixel (value before correction), and pixel value 3' is a value after correcting pixel value 3. C1 to C5 are filter coefficients of each tap, and the degree (intensity) of correction processing is determined by these coefficients.

The vertical LPF 106 and the horizontal LPF 107 perform the same processing (above mentioned processing), except that the tap direction is different.

The filter coefficient generation unit 105 determines the correction level (filter coefficient) for each pixel as follows, according to the distance coefficient, and holds the data.

If distance coefficient is 0: correction level=0 (LPF is not active)

If distance coefficient is 1: correction level=1 (LPF weakly active)

If distance coefficient is 2: correction level=2 (LPF strongly active)

Figure 8:
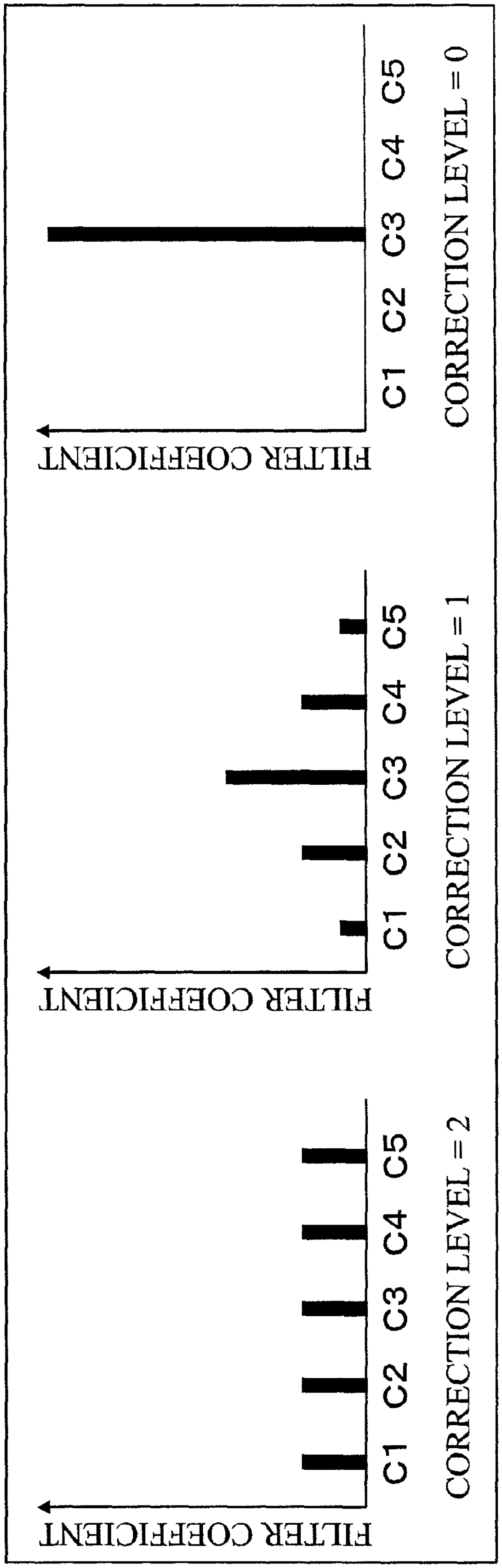
FIG. 8 are graphs depicting examples of filter coefficients.

In this example, it is assumed that the filter coefficient is stored in advance for each number of taps and correction level. FIG. 8 shows the relationship of the correction level and filter coefficient in the case when the number of taps is 5.

The correction level "2" is when the filter coefficients are approximately uniform. If such a filter coefficient is used, the LPF is strongly active (degree of correction processing becomes high).

The correction level "1" has a characteristic that the filter coefficient C3 of the correction target pixel is greatest, and the filter coefficient decreases as the distance from this position increases. If such a filter coefficient is used, the LPF is weakly active (degree of correction processing becomes low). The degree of correction processing decreases as the other filter coefficients, compared with the filter coefficient C3, become smaller.

The correction level "0" indicates that the filter coefficients other than the filter coefficient C3 of the correction target pixel are 0. Even if such a filter coefficient is used, the LPF does not work (correction processing is not performed).

In the case when the number of taps is 9 as well, the correction level and filter coefficient are linked.

The filter coefficients in FIG. 8 are merely examples, and a coefficient need not be these coefficients (the method for determination is not limited to this either). In these examples, the distance coefficients and correction levels are divided into 3 levels, but may be divided into 3 or more levels (e.g. 5 or 10 levels), or may be 2 levels just to determine whether correction processing is performed or not.

(Processing with LPF)

Processing with an LPF will now be described in concrete terms with reference to FIG. 9, FIG. 10A and FIG. 10B. First processing with the vertical LPF 106 will be described in detail.

FIG. 9 shows an example of each variable determined for a certain pixel. Based on the se variables, the vertical LPF 106 performs filter processing. In concrete terms, the vertical LPF 106 uses a correction level, vertical filter EN, vertical 5 tap EN, vertical 9 tap EN and vertical motion vector Vy.

Figure 10A:
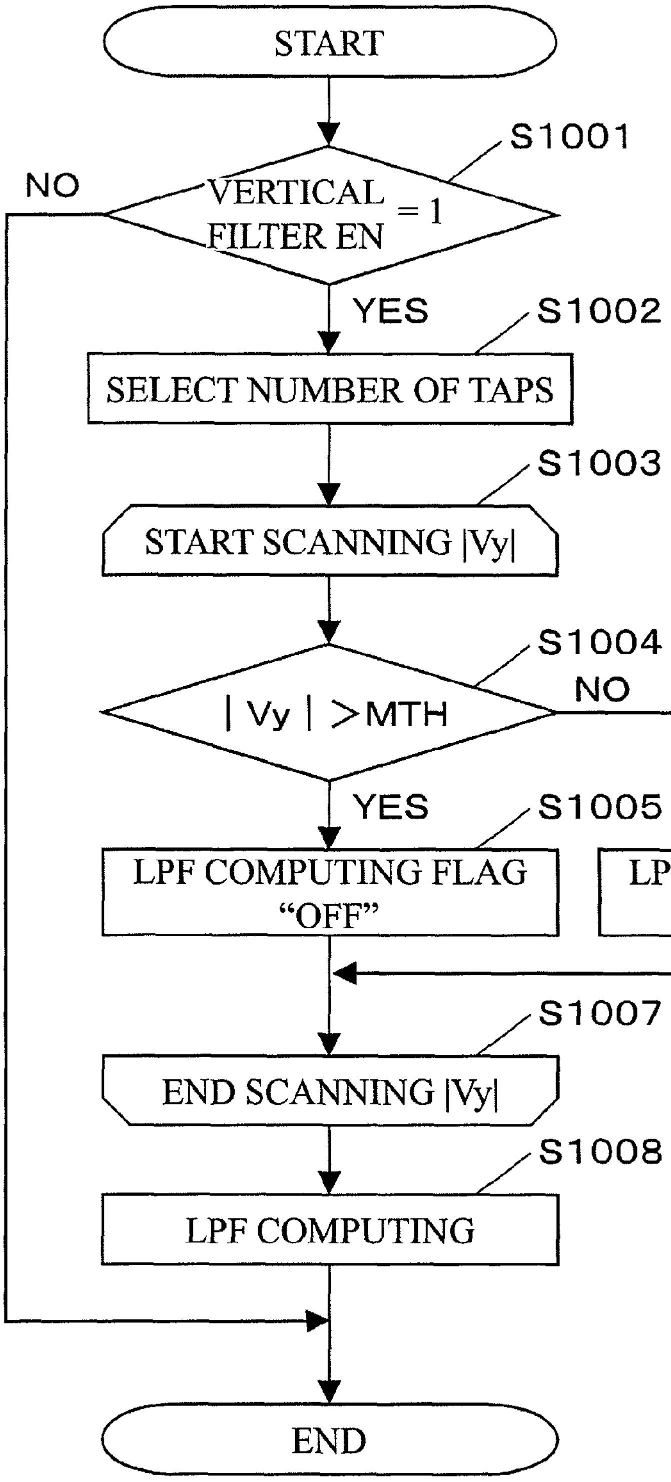
FIG. 10A is a flow chart depicting an example of a processing flow with a vertical LPF.

FIG. 10A is a flow chart depicting a processing flow of the vertical LPF 106.

In step S1001, it is determined whether the vertical filter EN is "1" or not, and if "1", processing advances to step S1002, and if not "1", processing ends without performing filter processing (vertical LPF processing) with the vertical LPF 106.

In step S1002, the vertical 5 tap EN and vertical 9 tap EN are checked, and a number of taps is selected. In concrete terms, the number of taps is set to 5 if the vertical 5 tap EN is "1", and the number of taps is set to 9 if the vertical 9 tap EN is "1".

In step S1003, the absolute value |Vy| of the vertical component of the motion vector (vertical motion vector) of each pixel (peripheral pixel located around the correction target pixel), corresponding to the taps of the filter used for the vertical LPF 106, is sequentially scanned.

In step S1004, it is determined whether the absolute value |Vy| of the scanned pixel is greater than a threshold MTH (predetermined threshold), and if greater processing advances to step S1005, and if lesser processing advances to step S1006. The threshold used here is the same as the threshold used for Expressions (1-1) and (1-2), but the threshold is not limited to this (a value different from the value used for Expressions (1-1) and (1-2) may be set as the threshold). The presence of the motion vector (whether the size is 0 or not) may be determined without using a threshold (in other words, 0 may be set for the threshold).

In this example, it is preferable that the motion pixel (pixel of which |Vy| is greater than the threshold MTH) is not used for filter processing in order to decrease the frequency components in the still area.

Therefore in step S1005, an LPF computing flag for the pixel is set to "OFF" since the motion vector of the scanned pixel is large (scanned pixel is the motion pixel). The LPF computing flag is a flag for determining whether the pixel is a pixel used for filter processing, and only the pixel for which this flag is "ON" is used for filter processing.

In step S1006, the motion vector of the scanned pixel is small (the scanned pixel is a still pixel), so the LPF computing flag for this pixel is set to "ON".

The processings in steps S1003 to S1007 are performed until the LPF computing flag is determined for all the taps. When the LPF computing flag is determined for all the taps, processing advances to step S1008.

In step S1008, Expression (1-3) is computed based on the LPF computing flag. In concrete terms, the filter coefficient corresponding to the pixel of which LPF computing flag is "OFF", out of the peripheral pixels, is set to "0".

Figure 10B:
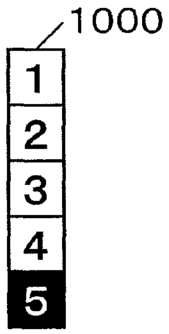
FIG. 10B is a diagram depicting an example of a vertical LPF.

In the case of the situation indicated by reference number 1000 in FIG. 10B, the pixel value after correction is calculated using the following Expression (1-4). The reference number 1000 indicates the vertical LPF having 5 taps, and numbers 1 to 5 are assigned to each tap. The pixel corresponding to the tap of No. 3 is the correction target pixel. The pixel filled in black (pixel corresponding to No. 5) indicates a position (pixel) which is not considered when filter processing is performed since |Vy| thereof is greater than the threshold MTH.

$$\text{Pixel value } 3' = \frac{\text{Pixel value } 1\times C1 + \text{Pixel value } 2\times C2 + \text{Pixel value } 3\times C3 + \text{Pixel value } 4\times C4}{C1+C2+C3+C4+C5} \quad \text{Expression (1-4)}$$

Now processing with the horizontal LPF 107 will be described. The horizontal LPF 107 performs filter processing using a correction level, horizontal filter EN, horizontal 5 tap EN, horizontal 9 tap EN and horizontal motion vector Vy. Description on this processing, which is the same as the processing with a vertical LPF 106, except for the tap direction of the filter, is omitted.

Figure 11:
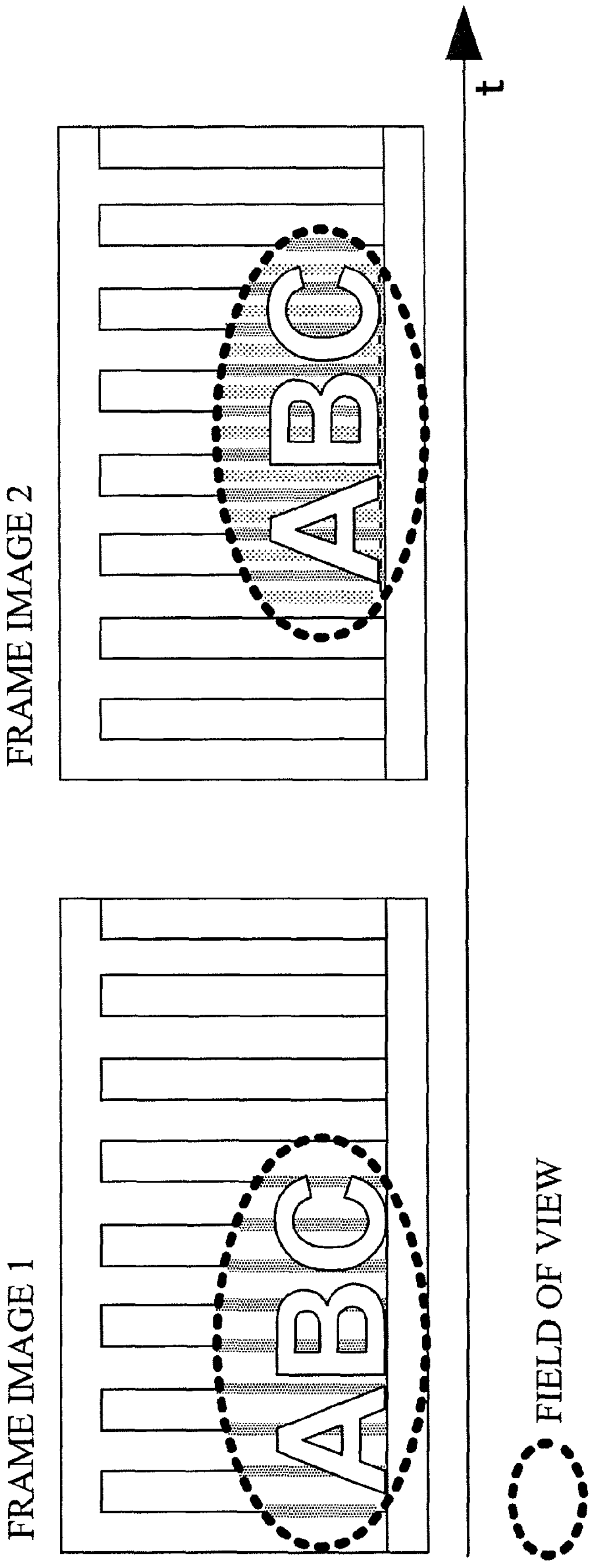
FIG. 11 are diagrams depicting an example of a corrected video signal.
Figure 15:
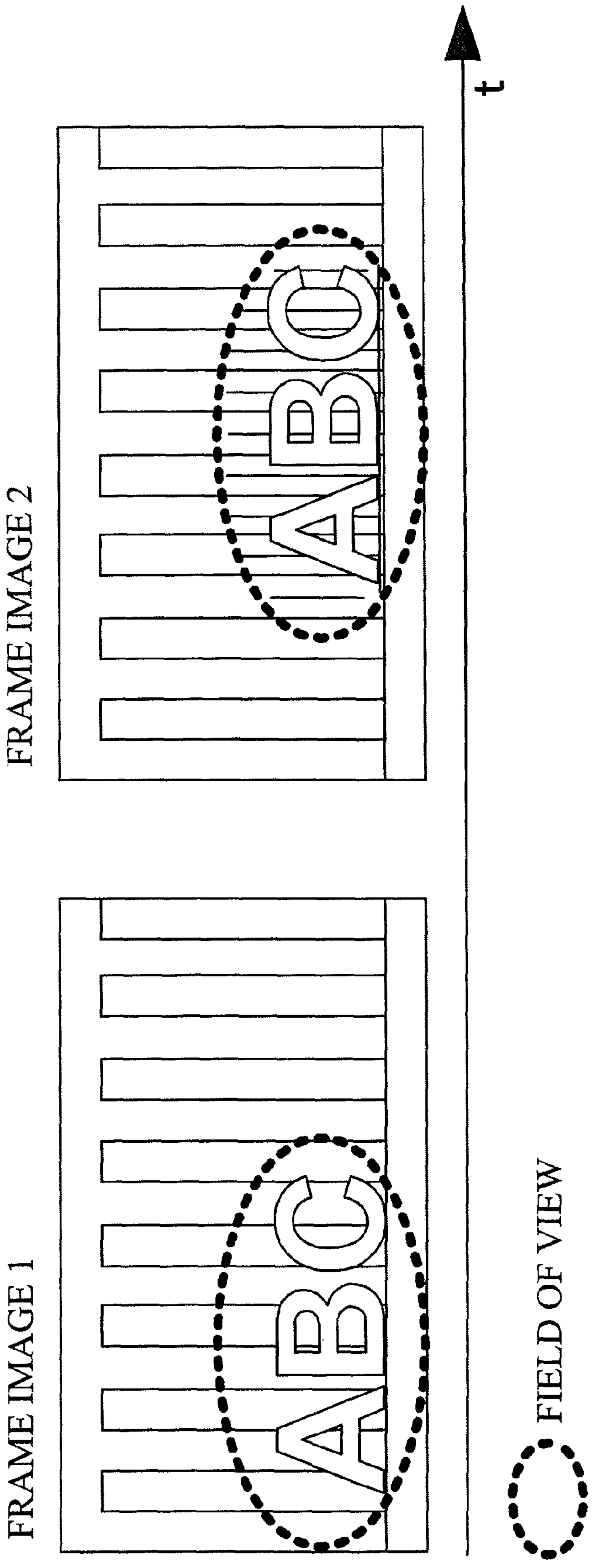
FIG. 15 is a diagram depicting a problem of a prior art.

By performing the above mentioned correction processing for an entire screen, high frequency components in a still area around which the motion of an image exists can be decreased (such an area can be blurred). Thereby interference due to a peripheral area of the motion area appearing to be multiple can be decreased. In concrete terms, if a moving object on a large screen display of which response speed is fast is tracked by human eyes, the background near the object appears to be multiple, as shown in FIG. 15. In this example, interference (artificial sensation) due to the background appearing to be multiple can be decreased by blurring this background (after image of the background), as shown in FIG. 11.

In an area other than such areas (areas on which viewer focuses), high frequency components are not decreased, so the above mentioned interference can be decreased without dropping the image quality of the area on which a viewer focuses.

In this example, the high frequency components are decreased using an LPF, but contrast or luminance may be decreased. For example, these values may be decreased by correcting the gamma curve.

In this embodiment, the APL is used as a luminance value of a partial area, but any luminance value can be used only if it is a luminance value representing the partial area. For example, the maximum luminance value of still pixels in the partial area may be regarded as the luminance value of that partial area.

In this example, processing is performed with the horizontal LPF 107, on the output result of the vertical LPF 106, but the processing with the horizontal LPF 107 may be performed before the vertical LPF 106. Also in this example, four types of LPFs (5 taps, 9 taps, horizontal tap direction and vertical tap direction) are used, but the LPFs to be used are not limited to these. For example, the LPFs of which numbers of taps are 3, 7 or 15, and of which tap directions are 30°, 45° or 60° (when the horizontal direction is 0° and the vertical direction is 90°) may be used (e.g. LPF in which the tap direction is diagonal; LPF in which taps are arrayed in a diagonal direction). If the motion of the image near the still pixel is in a diagonal direction, an LPF in which the tap direction is diagonal may be used instead of using both the vertical LPF 106 and the horizontal LPF 107. The processing by the vertical LPF 106 and the processing by the horizontal LPF 107 may be weighted according to the motion of the image near the still image.

In this example, the pattern characteristic quantity calculation unit 103 determines whether the image is moving or not for each pixel, but this determination need not be performed.

Since the distance determination unit 104 can perform such determination, the pattern characteristic quantity calculation unit 103 may obtain the determination result (determination result on whether the image is moving or not for each pixel) from the distance determination unit 104.

EXAMPLE 2

An image processing apparatus and image processing method according to Example 2 of the present invention will now be described. Description on the same functions as Example 1 is omitted.

Figure 12A:
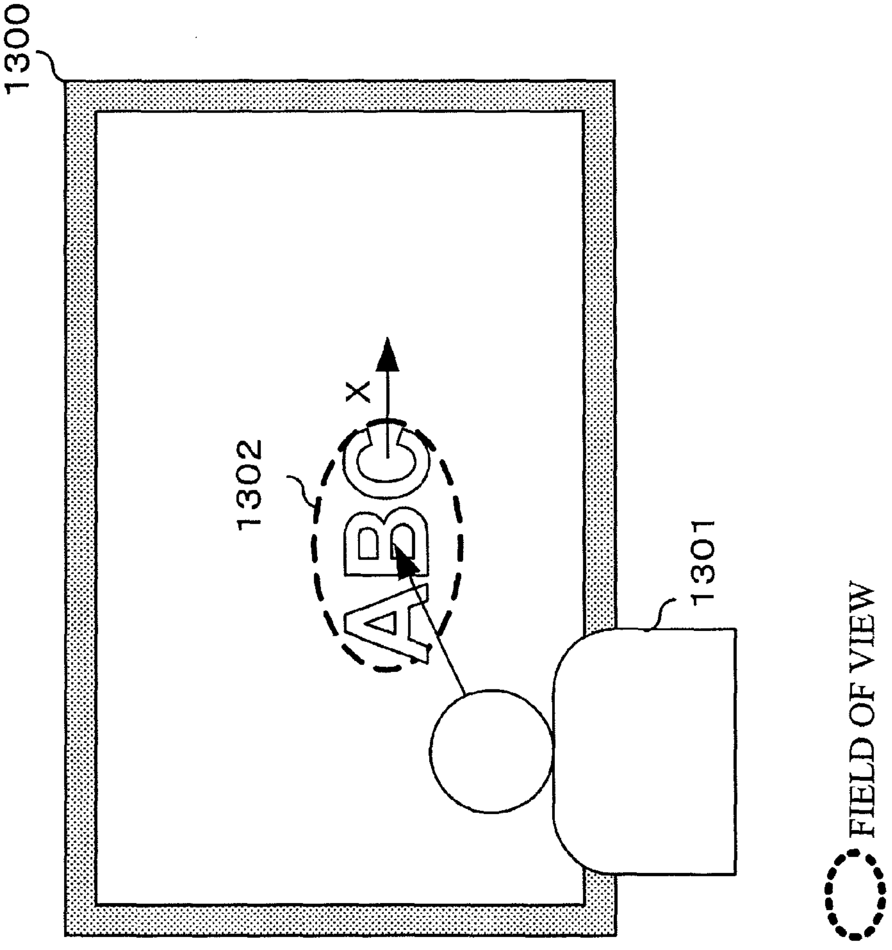
FIG. 12A and FIG. 12B are diagrams depicting a relationship of a position of a viewer and a field of view.
Figure 12B:
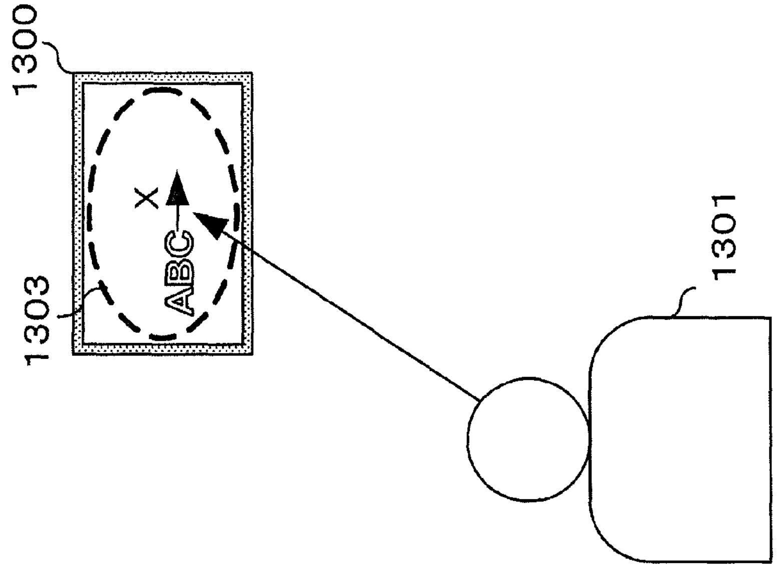

FIG. 12A and FIG. 12B show the difference of the field of view depending on the distance between the display 1300 and the viewer 1301. Areas 1302 and 1303 enclosed by the dotted line show a field of view of the viewer 1301. The telop "ABC" is displayed on the display 1300, which is moving in the direction of the arrow X.

FIG. 12A shows a state where the distance between the display 1300 and the viewer 1301 is short. If the distance between the display 1300 and the viewer 1301 is short, the field of view of the viewer 1301 is narrow, as indicated by the area 1302 (ratio of the field of view to the screen of the display is low). Therefore if the telop moves in the direction of the arrow X, the field of view (area 1302) also moves in the direction of the arrow X synchronizing with the telop.

FIG. 12B shows a state where the distance between the display 1300 and the viewer 1301 is longer than the case of FIG. 12A. If the distance between the display 1300 and the viewer 1301 is long, the field of view of the viewer 1301 is wide, as indicated as the area 1303 (ratio of the field of view to the screen of the display is high). Therefore even if the telop moves in the direction of the arrow X, the field of view (area 1303) does not move.

In other words, as the distance between the display and the viewer is shorter, the moving distance of the field of view, when the viewer tracks the motion of the image, increases. Therefore interference due to the peripheral area of the motion area appearing to be multiple increases.

Hence according to this example, the correction degree in the correction processing is increased as the distance between the display apparatus for displaying the input image and the viewer is shorter.

This will now be described in detail.

The image processing apparatus according to this example further has a peripheral human detection unit in addition to the configuration describe in Example 1.

(The Peripheral Human Detection Unit)

The peripheral human detection unit detects a viewer of the input image (the detection unit). In concrete terms, it is detected, by using a human detection sensor, whether a viewer of the display apparatus (display) for displaying the input image exists near the display apparatus. For example, the peripheral human detection unit (human detection sensor) is disposed in a same position as the display, and detects a human body (viewer) within a predetermined area (e.g. area in a 30 cm, 50 cm or 1 m radius) around the display position as the center.

And according to the detection result, a peripheral human determination flag is decided, and the result is output to the filter coefficient generation unit. The peripheral human determination flag is a flag for executing a predetermined processing when a human (viewer) exists near the display. In concrete terms, the peripheral human detection unit sets the peripheral human determination flag to "0" if a viewer is not detected, and to "1" if a viewer is detected.

As a method of detecting humans, any methods such as a method utilizing the abovementioned human detection sensor may be employed.

(Processing in the Filter Coefficient Generation Unit)

In this example, the filter coefficient generation unit corrects the correction level, which was determined by the method in Example 1, according to the peripheral human detection flag. In concrete terms, if the peripheral human detection flag is "1", it is more likely that a viewer is watching near the display, so the correction level "1" is corrected to the correction level "2". In other words, the correction level is set to "2" if the distance coefficient is "1". If the correction level "0" is corrected to "1", the entire screen blurs, so this kind of correction is not performed.

In this way, according to this example, the correction degree of the correction processing is increased as the distance between the display and the viewer is shorter. Since correction processing, considering the change of field of view of the viewer, is performed in this way, interference due to the peripheral area of the motion area appearing to be multiple can be decreased with certainty.

The ratio of the field of view to the screen of the display is changed not only by the distance between the display and the viewer, but also by the size of the screen of the display. In concrete terms, the ratio of the field of view to the screen of the display decreases as the size of the screen of the display increases, and the ratio of the field of view to the screen of the display increases as the size of the screen of the display decreases. Therefore it is preferable to increase the correction degree of the correction processing as the screen of the display increases. Thereby a similar effect as the above mentioned functional effect can be obtained.

In this example, the correction level "1", determined by the method in Example 1, is corrected to the correction level "2", but correction is restricted to this method. For example, if the correction level is divided into 4 levels, the correction levels "1" and "2" are corrected to the correction levels "2" and "3" respectively. (It is assumed that the correction degree is higher as the value of the correction level is greater.) The distance determination unit may correct the distance coefficient based on the distance between the display and the viewer. The correction degree of the correction processing in this case is increased as the distance between the display and the viewer is shorter.

In this example, the peripheral human detection unit determines whether a viewer exists in a predetermined area, but the peripheral human detection unit may be constructed such that the distance of the user from the display can be recognized when the viewer is detected.

EXAMPLE 3

An image processing apparatus and image processing method according to Example 3 of the present invention will now be described. Description on the same functions as Example 1 is omitted.

Figure 13:
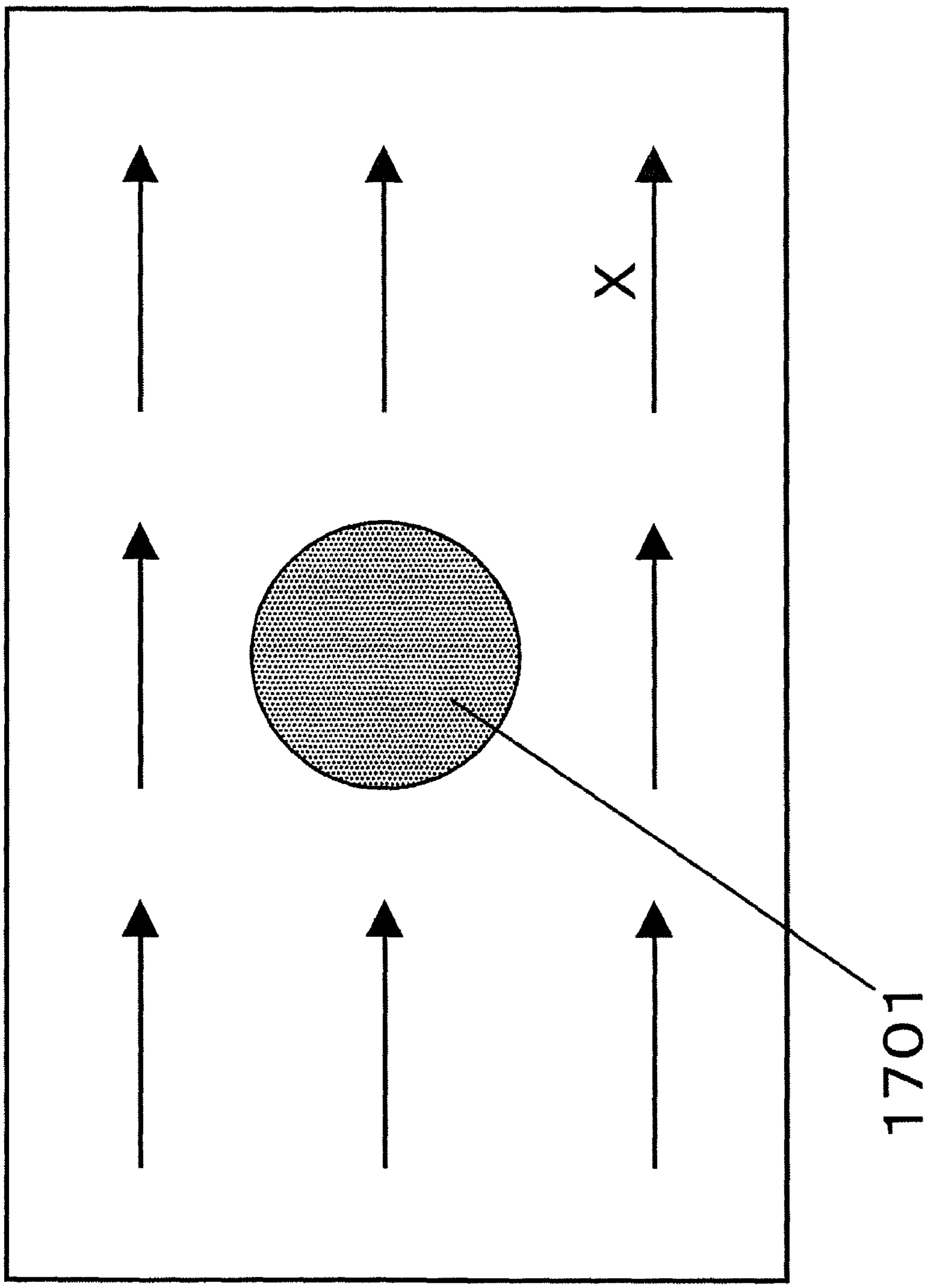
FIG. 13 is a diagram depicting an example of a panned image.

FIG. 13 is a diagram depicting an example of a panned image. A panned image refers to an image of which background is moving because a moving target (object) was shot while tracking. FIG. 13 shows an image photographed while tracking an object 1701 which is moving in a direction opposite of the direction of the arrow X. In this image, the object 1701 is stationary and the background is moving in the direction X. If the correction processing described in Examples 1 and 2 is performed on such an image, the object becomes blurred. Therefore in this example, correction processing is not performed if the input image is a panned image. This will be described in detail.

The image processing apparatus according to this example further has a pan determination unit in addition to the configuration of Example 1.

(The Pan Determination Unit)

The pan determination unit determines whether an input image is a panned image or not based on a motion vector detected by the motion vector detection unit (the pan determination unit). Whether an input image is a panned image or not can be determined based on a number of pixels of which horizontal components of the motion vector (horizontal motion vector Vx) is greater than 0, and a number of pixels of which horizontal motion vector Vx is smaller than 0, for example. Or the same can also be determined based on a number of pixels of which vertical components of the motion vector (vertical motion vector Vy) is greater than 0, and a number of pixels of which the vertical motion vector Vy is smaller than 0. In concrete terms, the following conditional expressions are used for this determination. If the motion vector detected by the motion vector detection unit satisfies one of the following expressions, the pan determination unit determines that this input image is a panned image. In the following expressions, PANTH denotes a threshold for determining whether the image is a panned image.

$$\frac{\text{Total number of pixels of } Vx > 0}{\text{Total number of pixels}} \times 100 > PANTH \quad \text{Expression (2-1)}$$

$$\frac{\text{Total number of pixels of } Vx < 0}{\text{Total number of pixels}} \times 100 > PANTH \quad \text{Expression (2-2)}$$

$$\frac{\text{Total number of pixels of } Vy > 0}{\text{Total number of pixels}} \times 100 > PANTH \quad \text{Expression (2-3)}$$

$$\frac{\text{Total number of pixels of } Vy > 0}{\text{Total number of pixels}} \times 100 > PANTH \quad \text{Expression (2-4)}$$

Then the pan determination unit decides a pan determination flag according to the determination result, and outputs it to the filter conversion generation unit. The pan determination flag is a flag for executing a predetermined processing if the input image is a panned image. In concrete terms, if it is determined that the input image is not a panned image, the pan determination unit sets the pan determination flag to "0", and if it is determined that the input image is a panned image, the pan determination flag is set to "1".

(Processing in the Filter Coefficient Generation Unit)

In this example, the filter coefficient generation unit determines whether the correction processing is performed or not according to the pan determination flag.

For example, a processing for checking the pan determination flag is added to the flow chart in FIG. 6. In concrete terms, this processing is performed between step S601 and step S602. After step S601, processing advances to step S602 if the pan determination flag is "0", and processing ends if the pan determination flag is "1".

In this way, according to this example, the correction processing is not performed if the input image is a panned image, so the target area becoming blurred by correction processing can be prevented.

Figure 14A:
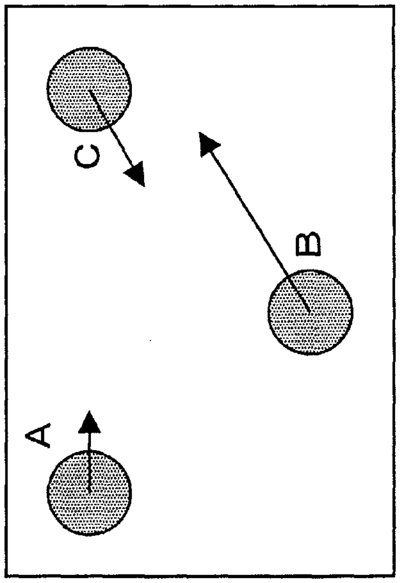
FIG. 14A is a diagram depicting an example of an image in which a plurality of motion areas exist.

If there are a plurality of areas where an image is moving, as shown in FIG. 14A, it is less likely that the viewer is tracking one object. Therefore in such a case, interference due to the area appearing to be multiple is small. FIG. 14A shows an example when three areas (areas in which motion vectors are A, B and C) exist.

For such a case, the image processing apparatus further has a function to determine whether a plurality of motion areas exist in the current frame image (the motion area determination unit). And if a plurality of motion areas exist in the current frame image, correction processing may not be performed. Since correction processing is not performed for input images for which the obtained effect is low, the processing load can be decreased.

Figure 14B:
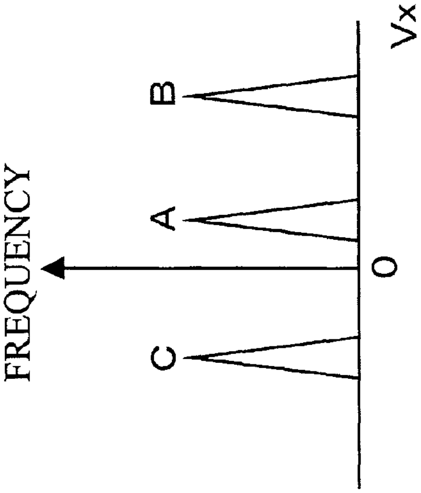
FIG. 14B is a diagram depicting an example of a distribution of horizontal motion vectors Vx in the image in FIG. 14A.
Figure 14C:
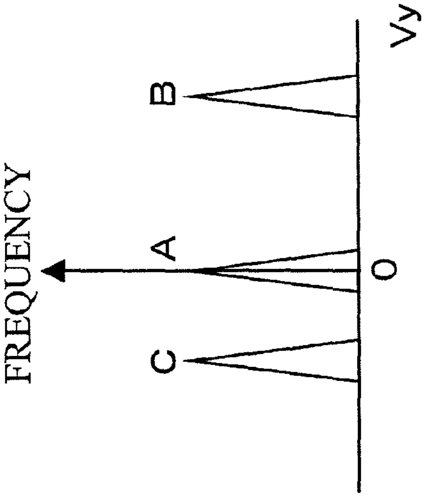
FIG. 14C is a diagram depicting an example of a distribution of vertical motion vectors Vy in the image in FIG. 14A.

Whether a plurality of motion areas exist or not can be determined based on the motion vectors detected by the motion vector detection unit. Whether a plurality of motion areas exist or not can be determined using the distribution of the horizontal motion vectors Vx and the distribution of the vertical motion vectors Vy, for example. FIG. 14B shows an example of the distribution of the horizontal motion vectors Vx (histogram of which abscissa is Vx and ordinate is the frequency thereof (number of pixels)). FIG. 14C shows an example of the distribution of the vertical motion vectors Vy (histogram of which abscissa is Vy and ordinate is the frequency thereof (number of pixels)). In concrete terms, if a plurality of motion areas exist, the frequency distribution has a plurality of peaks (peaks A, B and C), as shown in FIG. 14A and FIG. 14C. In such a case, correction processing may not be performed regarding that a plurality of motion areas exist.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-297851, filed on Dec. 28, 2009, and Japanese Patent Application No. 2010-201963, filed on Sep. 9, 2010, which are hereby incorporated by reference herein in their entirety.

What is claimed is:

1. An image processing apparatus comprising:

a motion detection unit that detects a motion from an input image;

a determination unit that determines whether a distance between a motion pixel in which the image is moving and a still pixel in which the image is not moving is shorter than a predetermined distance based on a detection result of the motion detection unit; and a correction unit that performs correction processing to decrease at least one of high frequency components, contrast, and luminance for the still pixel about which determination has been made that a distance from a motion pixel is shorter than the predetermined distance by the determination unit when a frequency distribution of an area to which the still pixel belongs is concentrated to a specific frequency.

2. The image processing apparatus according to claim 1, further comprising, a frequency distribution calculation unit that divides a frame image that includes a correction target pixel into a plurality of sub-areas, and calculates, for each of the sub-areas, the frequency distribution in use of a still pixel located in the sub-area, the correction target pixel being the still pixel about which determination has been made that a distance from a motion pixel is shorter than the predetermined distance, wherein the correction unit performs the correction processing for the correction target pixel when the frequency distribution of a sub-area to which this correction target pixel belongs is concentrated to the specific frequency.

3. The image processing apparatus according to claim 1, further comprising a luminance value calculation unit that divides a frame image that includes a correction target pixel into a plurality of sub-areas, and calculates, for each of the sub-areas, a luminance value in use of a still pixel located in each of the sub-areas, the correction target pixel being the still pixel about which determination has been made that a distance from a motion pixel is shorter than the predetermined distance, wherein the correction unit performs the correction processing for the correction target pixel when a luminance value of a sub-area, to which this correction target pixel belongs, is higher than a predetermined luminance value.

4. The image processing apparatus according to claim 1, wherein the correction unit increases a correction degree in the correction processing as a distance between a correction target pixel and the motion pixel is shorter, the correction target pixel being the still pixel about which determination has been made that a distance from a motion pixel is shorter than the predetermined distance.

5. The image processing apparatus according to claim 1, further comprising a motion area determination unit that determines whether a plurality of motion areas, where an image is moving, exist or not in a frame image including a correction target pixel, based on the motion of the image for each of the pixels, the correction target pixel being the still pixel about which determination has been made that a distance from a motion pixel is shorter than the predetermined distance, wherein the correction unit does not perform the correction processing when a plurality of motion areas exist in the frame image.

6. The image processing apparatus according to claim 1, wherein the correction unit increases a correction degree in the correction processing as a screen of a display apparatus which displays the input image is larger.

7. The image processing apparatus according to claim 1, further comprising a detection unit that detects a viewer of the input image, wherein the correction unit increases a correction degree in the correction processing as a distance between a display apparatus which displays the input image and the viewer is shorter.

8. The image processing apparatus according to claim 1, further comprising a pan determination unit that determines whether the input image is a panned image or not based on the detection result of the motion detection unit, wherein the correction unit does not perform the correction processing when the input image is a panned image.

9. The image processing apparatus according to claim 1, wherein the motion detection unit detects a motion vector from an input image, the correction processing is filter processing, and the correction unit sets to 0 a filter coefficient, which corresponds to a pixel of which magnitude of a motion vector is larger than a predetermined threshold, out of peripheral pixels located around a correction target pixel, the correction target pixel being the still pixel about which determination has been made that a distance from a motion pixel is shorter than the predetermined distance.

10. The image processing apparatus according to claim 1, wherein the motion detection unit detects a motion vector from an input image, the correction processing is filter processing, and the correction unit performs the filter processing using a filter which has a greater number of taps as a magnitude of the motion vector of the motion pixel, which has been determined to exist in the predetermined range, is larger.

11. The image processing apparatus according to claim 1, wherein the motion detection unit detects a motion vector from an input image, the correction processing is filter processing, and the correction unit performs the filter processing using a filter in which taps are arrayed in a direction according to a direction of the motion vector of a motion pixel which has been determined to exist in the predetermined range.

12. An image processing method comprising:

a motion detection step of detecting a motion from an input image;

a determination step of determining whether a distance between a motion pixel in which the image displayed on said display apparatus is moving and a still pixel in which the image displayed on said display apparatus is not moving is shorter than a predetermined distance based on a detection result of the motion detection step; and a correction step of performing correction processing to decrease at least one of high frequency components, contrast, and luminance for the still pixel about which determination has been made that a distance from a motion pixel is shorter than the predetermined distance by the determination step when a frequency distribution of an area to which the still pixel belongs is concentrated to a specific frequency.

13. The image processing apparatus according to claim 1, further comprising, a frequency distribution calculation unit that calculates the frequency distribution of a frame image that includes a correction target pixel, the correction target pixel being the still pixel about which determination has been made that a distance from a motion pixel is shorter than the predetermined distance, wherein the correction unit performs the correction processing for the correction target pixel when the frequency distribution of the frame image that includes the correction target pixel is concentrated to the specific frequency.

14. The image processing method according to claim 12, further comprising, a frequency distribution calculation step of dividing a frame image that includes a correction target pixel into a plurality of sub-areas, and calculating, for each of the sub-areas, the frequency distribution in use of a still pixel located in the sub-area, the correction target pixel being the still pixel about which determination has been made that a distance from a motion pixel is shorter than the predetermined distance, wherein in the correction step, the correction processing is performed for the correction target pixel when the frequency distribution of a sub-area to which this correction target pixel belongs is concentrated to the specific frequency.

15. The image processing method according to claim 12, further comprising a luminance value calculation step of dividing a frame image that includes a correction target pixel into a plurality of sub-areas, and calculating, for each of the sub-areas, a luminance value in use of a still pixel located in each of the sub-areas, the correction target pixel being the still pixel about which determination has been made that a distance from a motion pixel is shorter than the predetermined distance, wherein in the correction step, the correction processing is performed for the correction target pixel when a luminance value of a sub-area, to which this correction target pixel belongs, is higher than a predetermined luminance value.

16. The image processing method according to claim 12, wherein in the correction step, a correction degree in the correction processing is increased as a distance between a correction target pixel and the motion pixel is shorter, the correction target pixel being the still pixel about which determination has been made that a distance from a motion pixel is shorter than the predetermined distance.

17. The image processing method according to claim 12, further comprising a motion area determination step of determining whether a plurality of motion areas, where an image is moving, exist or not in a frame image including a correction target pixel, based on the motion of the image for each of the pixels, the correction target pixel being the still pixel about which determination has been made that a distance from a motion pixel is shorter than the predetermined distance, wherein in the correction step, the correction processing is not performed when a plurality of motion areas exist in the frame image.

18. The image processing method according to claim 12, wherein in the correction step a correction degree in the correction processing is increased as a screen of a display apparatus which displays the input image is larger.

19. The image processing method according to claim 12, further comprising a detection step of detecting a viewer of the input image, wherein in the correction step, a correction degree in the correction processing is increased as a distance between a display apparatus which displays the input image and the viewer is shorter.

20. The image processing method according to claim 12, further comprising a pan determination step of determining whether the input image is a panned image or not based on the detection result of the motion detection step, wherein in the correction step, the correction processing is not performed when the input image is a panned image.

21. The image processing method according to claim 12, wherein in the motion detection step, a motion vector is detected from an input image, the correction processing is filter processing, and in the correction step, a filter coefficient, which corresponds to a pixel of which magnitude of a motion vector is larger than a predetermined threshold, out of peripheral pixels located around a correction target pixel is set to 0, the correction target pixel being the still pixel about which determination has been made that a distance from a motion pixel is shorter than the predetermined distance.

22. The image processing method according to claim 12, wherein in the motion detection step, a motion vector is detected from an input image, the correction processing is filter processing, and in the correction step, the filter processing is performed using a filter which has a greater number of taps as a magnitude of the motion vector of the motion pixel, which has been determined to exist in the predetermined range, is larger.

23. The image processing method according to claim 12, wherein in the motion detection step, a motion vector is detected from an input image, the correction processing is filter processing, and in the correction step, the filter processing is performed using a filter in which taps are arrayed in a direction according to a direction of the motion vector of a motion pixel which has been determined to exist in the predetermined range.

24. The image processing method according to claim 12, further comprising, a frequency distribution calculation step of calculating the frequency distribution of a frame image that includes a correction target pixel, the correction target pixel being the still pixel about which determination has been made that a distance from a motion pixel is shorter than the predetermined distance, wherein in the correction step, the correction processing is performed for the correction target pixel when the frequency distribution of the frame image that includes the correction target pixel is concentrated to the specific frequency.

25. An image processing apparatus comprising:

a motion detection unit that detects a motion from an input image;

a correction unit that performs correction processing to decrease at least one of high frequency components, contrast, and luminance for a still pixel, in which the image is not moving, near a motion pixel in which the image is moving, when a frequency distribution of an area to which the still pixel belongs having a specific cyclic pattern.

26. An image processing method comprising:

detecting, by a motion detection unit, a motion from an input image; and performing, by a correction unit, correction processing to decrease at least one of high frequency components, contrast, and luminance for a still pixel, in which the image is not moving, near a motion pixel in which the image is moving, when a frequency distribution of an area to which the still pixel belongs having a specific cyclic pattern.

* * * * *